(12) United States Patent
Phillips et al.

(10) Patent No.: US 6,280,615 B1
(45) Date of Patent: Aug. 28, 2001

(54) FLUID MIXER AND WATER OXYGENATOR INCORPORATING SAME

(75) Inventors: Laurence Colin Phillips, Merredin; John Phillip Browne, Bayswater, both of (AU)

(73) Assignee: Innotech Pty. Ltd., Balcutta (AU)

( * ) Notice: Subject to any disclaimer, the term of this patent is extended or adjusted under 35 U.S.C. 154(b) by 0 days.

(21) Appl. No.: 09/381,258

(22) PCT Filed: Mar. 17, 1998

(86) PCT No.: PCT/AU98/00167

§ 371 Date: Nov. 22, 1999

§ 102(e) Date: Nov. 22, 1999

(87) PCT Pub. No.: WO98/41315

PCT Pub. Date: Sep. 24, 1998

(30) Foreign Application Priority Data

Mar. 17, 1997 (AU) .................................................. PO 5660

(51) Int. Cl.[7] .................. C02F 1/32; C02F 1/72; A61L 2/10; B01F 3/04; B01F 5/10
(52) U.S. Cl. ................ 210/198.1; 210/199; 210/748; 210/205; 210/220; 422/186.3; 250/436; 250/438; 366/338; 366/341
(58) Field of Search ................ 210/748, 198.1, 210/199, 220, 205; 422/186.3; 366/338, 341; 250/436, 438

(56) References Cited

U.S. PATENT DOCUMENTS 4,230,571 * 10/1980 Dadd .
4,968,437 * 11/1990 Noll et al. .
5,785,845 * 7/1998 Colaiano .

FOREIGN PATENT DOCUMENTS

94/29017 * 12/1994 (WO) .

* cited by examiner

*Primary Examiner*—Thomas M. Lithgow
(74) *Attorney, Agent, or Firm*—Knobbe, Martens, Olson & Bear, LLP

(57) ABSTRACT

A fluid mixer includes an elongate mixing chamber having an inlet system at one end for admission of liquid and gas to be intimately mixed by passage through the chamber and an outlet for the mixture at the opposite end, wherein opposed longitudinal sides of the chamber are each defined by a surface of scallop shape having peaks and troughs, with the peaks of the two surfaces being relatively offset so as to cause the liquid and gas entering the chamber to flow along a generally sinuous path through the chamber to create a turbulent flow which promotes intimate mixing. Advantageously a UV source extends within the chamber to sterilize the liquid flowing through the chamber.

7 Claims, 6 Drawing Sheets

FLUID MIXER AND WATER OXYGENATOR INCORPORATING SAME

The present invention relates to fluid mixers, for example for use in mixing liquids, or liquids and gases.

A particular application of the invention is in mixing oxygen or air with water for cleaning the water in a swimming pool without the need for chlorine.

In the cleaning of water for use in swimming pools it is known to add chlorine. This has the disadvantage that chlorine is a poison and many people develop skin problems from long exposure to chlorinated water in swimming pools. In some countries, such as USA and Germany, the use of chlorine in swimming pools has been banned and instead ozone treatment is used. A disadvantage of ozone treatment is that an extremely large amount of energy is required to generate sufficient ozone to treat the water, and then to ensure that there is no ozone remaining in the water when it is returned to the swimming pool.

We believe that the main cause of contamination of water in a swimming pool is due to anaerobic bacteria. One method of dealing with this contamination is to introduce air or oxygen at sufficiently high concentrations as to saturate the water which then kills the anaerobic bacteria. In addition UV radiation can be applied to the water to destroy other contaminants and other forms of biological material. We also believe that a significant factor in achieving good treatment of the water with the use of air/oxygen and UV radiation involves the use of a mixer which will vigorously mix the gas and liquid and bring all of the water into close proximity to the UV radiation.

According to one aspect of the present invention, there is provided a fluid mixer including an elongate mixing chamber having an inlet at one end for admission of fluid and an outlet at an opposite end, the chamber having in longitudinal cross-section an interior profile which, when considered along a longitudinal plane, consists of a series of troughs and peaks at each side of the longitudinal axis and extending along the length of the chamber, the series of troughs and peaks being at the opposite sides of the longitudinal axis being relatively displaced so that the peaks of the profile along one side face the troughs of the profile along the other side, the configuration of the troughs and peaks causing fluid entering the chamber through the inlet to flow along a tortuous path through the chamber towards the outlet to create a turbulent flow which promotes intimate mixing within the fluid.

According to another aspect of the present invention, there is provided a fluid mixer comprising an elongate mixing chamber having an inlet system at one end for admission of liquid and gas to be intimately mixed by passage through the chamber and an outlet for the mixture at the opposite end, wherein opposed longitudinal sides of the chamber are each defined by a respective series of concave surfaces spaced longitudinally of the chamber, with the concave surfaces at the opposite sides being so configured as to cause the liquid and gas entering the chamber to flow along a generally sinuous path through the chamber to create a turbulent flow which promotes intimate mixing.

According to yet another aspect of the present invention, there is provided a water steriliser and oxygenator including an elongate mixing chamber having an inlet at one end and an outlet at an opposite end, an inlet system coupled to the inlet and comprising a venturi through which incoming water flows, said venturi having a throat communicating with an air inlet whereby air is drawn into the venturi by the water flowing therethrough, sterilising means extending longitudinally within the mixing chamber, the mixing chamber having opposed longitudinal sides each profiled to define a series of troughs of arcuate cross-section spaced along the length of the chamber, with the troughs along one side being longitudinally offset with respect to the troughs along the other side whereby the water is caused to flow through the chamber along a path which traverses repeatedly from one side of the chamber to the other with a turbulent flow which promotes intimate mixing of the water and air, and parts of the troughs relatively close to the sterilising means confine the liquid flow past those parts to zones relatively close to the sterilising means to promote effective sterilisation.

According to yet another aspect of the invention, there is provided a fluid mixer including an elongate mixing chamber having an inlet system at one end for admission of liquid and gas to be intimately mixed by passage through the chamber and an outlet for the mixture at the opposite end, wherein opposed longitudinal sides of the chamber are each defined by a surface of scallop shape having peaks and troughs, with the peaks of the two surfaces being relatively offset so as to cause the liquid and gas entering the chamber to flow along a generally sinuous path through the chamber to create a turbulent flow which promotes intimate mixing.

Embodiments of the invention will now be described, by way of example only, with reference to the accompanying drawings in which.

Figure 1:
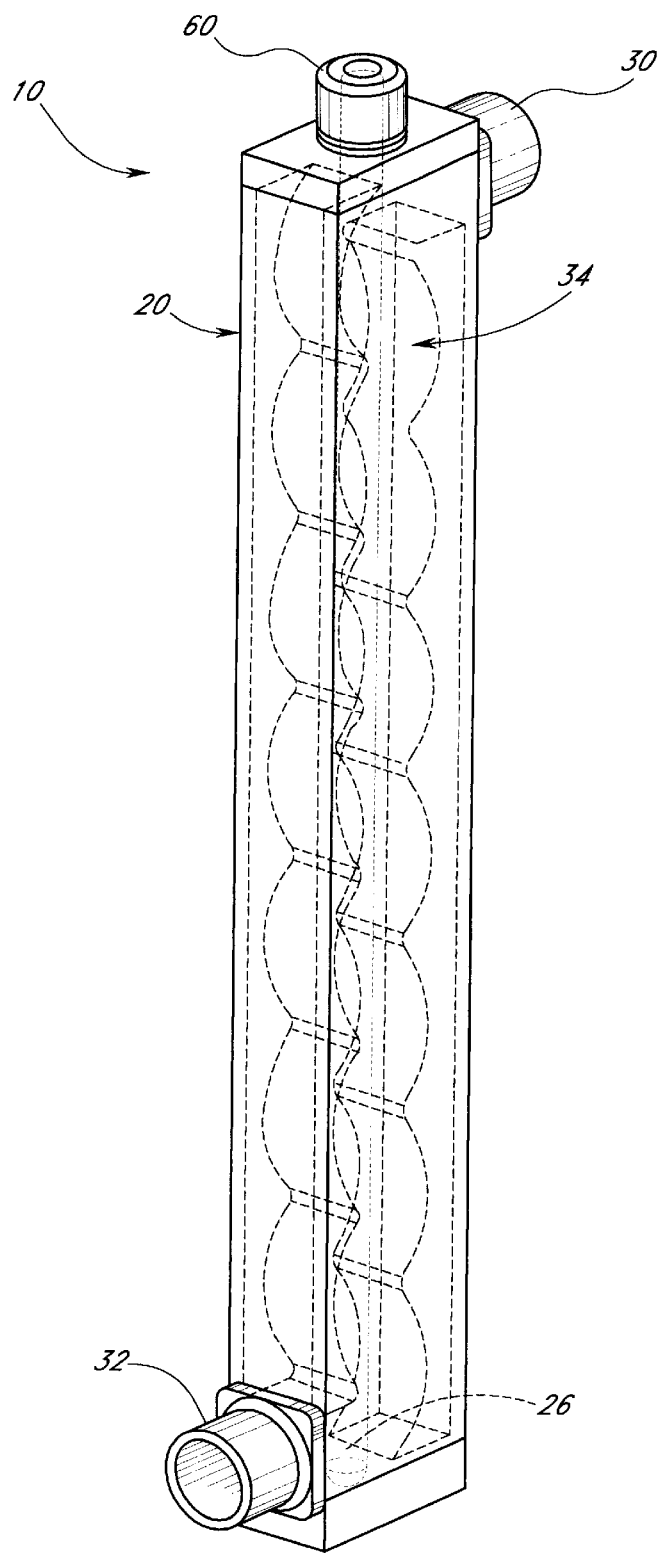
FIG. 1 is a perspective view, seen from above, of a fluid mixer in accordance with a preferred embodiment of the present invention.

In the drawings there is shown a fluid mixer 10 in the form of an oxygenator for mixing air or oxygen into water, particularly, but not exclusively, for use in the treatment of swimming pool water as a substitute for chlorine.

The fluid mixer 10 comprises a housing 20, an inlet pipe 22, an outlet pipe 24 and a UV source 26 extending longitudinally in a mixing chamber within the housing. The housing 20 is elongate and substantially rectangular in external cross-section. The housing 20 has an inlet 30 connected to the inlet pipe 22 and an outlet 32 connected to the outlet pipe 24. The housing 20 has an elongate mixing chamber 34 which defines a generally sinuous or tortuous path. for the flow of fluid from the inlet 30 to the outlet 32.

Preferably, the housing 20 is made from a plastics material which is resistant to corrosion by UV and ozone, such as, for example, polycarbonate, polypropylene, polyethylene or the like. Typically, the housing 20 is translucent or opaque.

In the embodiment shown, the chamber 34 has two opposing side walls 36 which have a substantially sinuous profile and two connecting side walls 38 which are substantially planar. The sinuous side walls 36 each have peaks 40 and troughs 42. The troughs 42 are of arcuate cross-section as considered in a longitudinal plane (for example the plane of FIGS. 2, 4 and 6) and are preferably of part-cylindrical shape between the side walls 38 as can be seen from FIG. 1. Each peak 40 connects the inner end edges of two adjacent troughs 42 and is of very small length longitudinally in comparison with that of the troughs 42 so that, in effect, the peaks 40 form cusps between adjacent troughs 42. Expressed differently, the sinuous side walls 36 have a shape which is defined by a substantially cosine squared mathematical function, with the zero points of the function (corresponding to the peaks 40) being curved tightly instead of being pointed. Such a shape may also be referred to as scallop shaped. The two sinuous side walls 36 are offset with respect to each other so that the peaks of one of the sinuous side walls 36 correspond to the troughs 42 of the other sinuous side wall 36.

Figure 6:
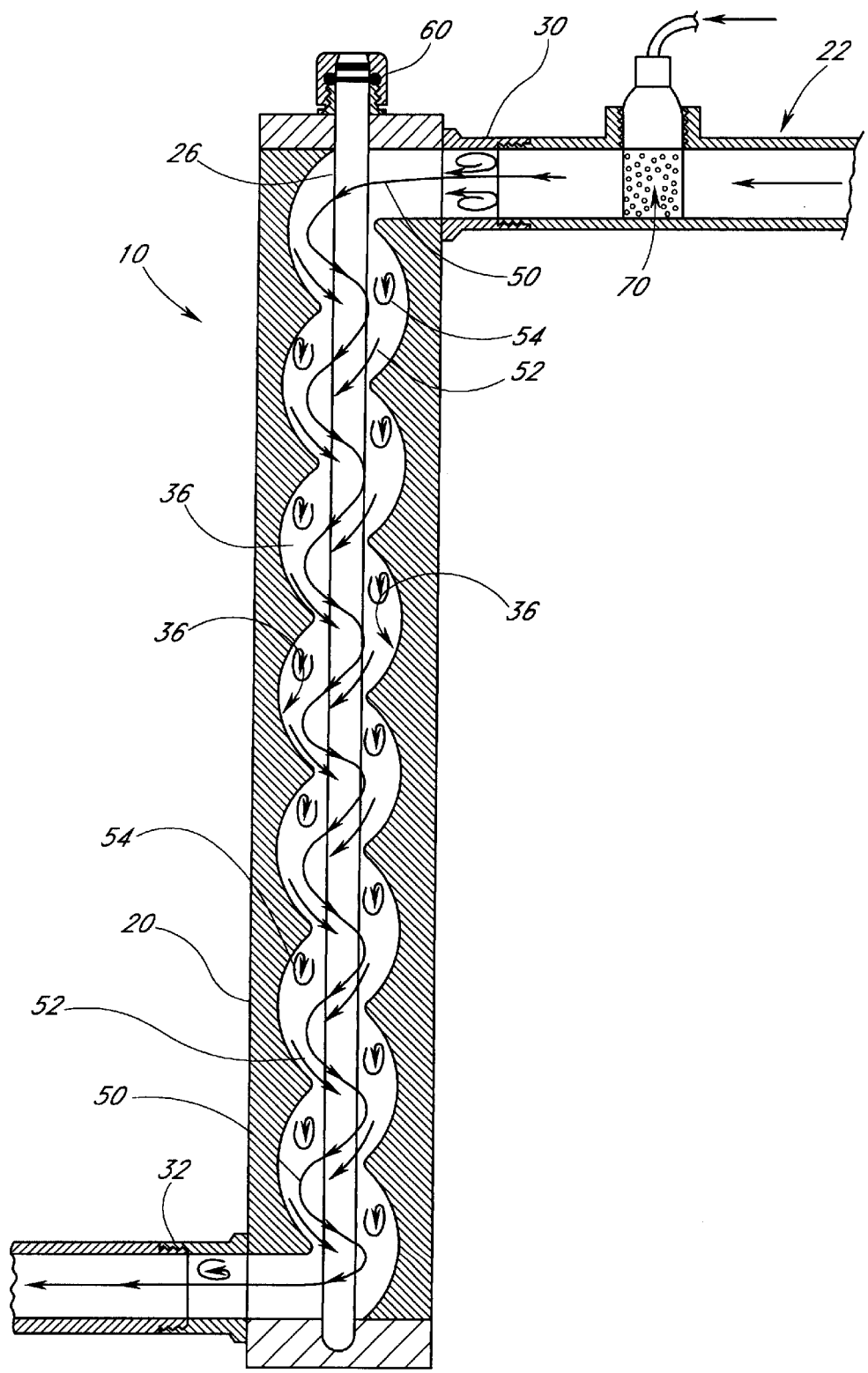
FIG. 6 is a part cross-sectional side view of the fluid mixer of FIG. 1 showing schematically the nature of the mixing which is produced.

The effect of the shape of the opposing side walls 36 of the chamber 34 is that the fluid entering the housing 20 at the inlet 22 follows fluid paths 50, 52 and 54 (see FIG. 6). The fluid path 50 represents the main path of fluid flow along which the bulk of the volume of the fluid travels. It is important to note that the fluid path 50 comes into close proximity to the UV source 26 many times (as shown about 15 times) along the length of the chamber 34. This has the effect that the bulk of the volume of the fluid comes into close proximity with the UV radiation a relatively large number of times along the chamber 34. Advantageously, the configuration of the chamber 34 is such that the bulk of the fluid periodically passes to about 5 mm or less from the UV source which promotes effective radiation.

The fluid paths 52 are detaching flows of the fluid which leave contact with the sinuous side walls 36 at the peaks 40 and force the fluid path 50 to change its direction and re-cross the UV source 26.

The fluid paths 54 are eddies which are caused by the separation of the fluid paths 52 from the sinuous side walls 36. The eddies add to the mixing effect of the fluid mixer 10.

These three fluid paths 50, 52, 54 have the effect of causing intimate mixing of the fluids entering into the chamber 34. At the same time the three fluid paths 50 to 54 have the effect of bringing the mixed fluids into intimate contact with the UV source for increasing the efficacy of irradiation of the fluids.

The housing 20 has a cap 60 which holds the UV source 26 in the chamber 34 and seals the chamber 34 so that it is fluid tight. Preferably, O-ring seals are used between the UV source 26 and the cap 60 and the housing 20 for this purpose. The UV source 26 comprises a UV element mounted within a tube. Preferably, the UV source 26 operates at wavelengths of about 254 nm (for producing a germicidal effect) and 180 nm (for the production of elemental oxygen and ozone). In one practical example the UV source has a power consumption of about 0.075 kW of electricity for use in a chamber which is about 860 nm long, about 50 mm wide and about 50 mm deep. Preferably, the UV source is located about 5 mm from the peaks 40 of the side walls 36 so as to ensure that the fluid comes into close proximity to the UV source 26 as it flows through the chamber 34.

Figure 2:
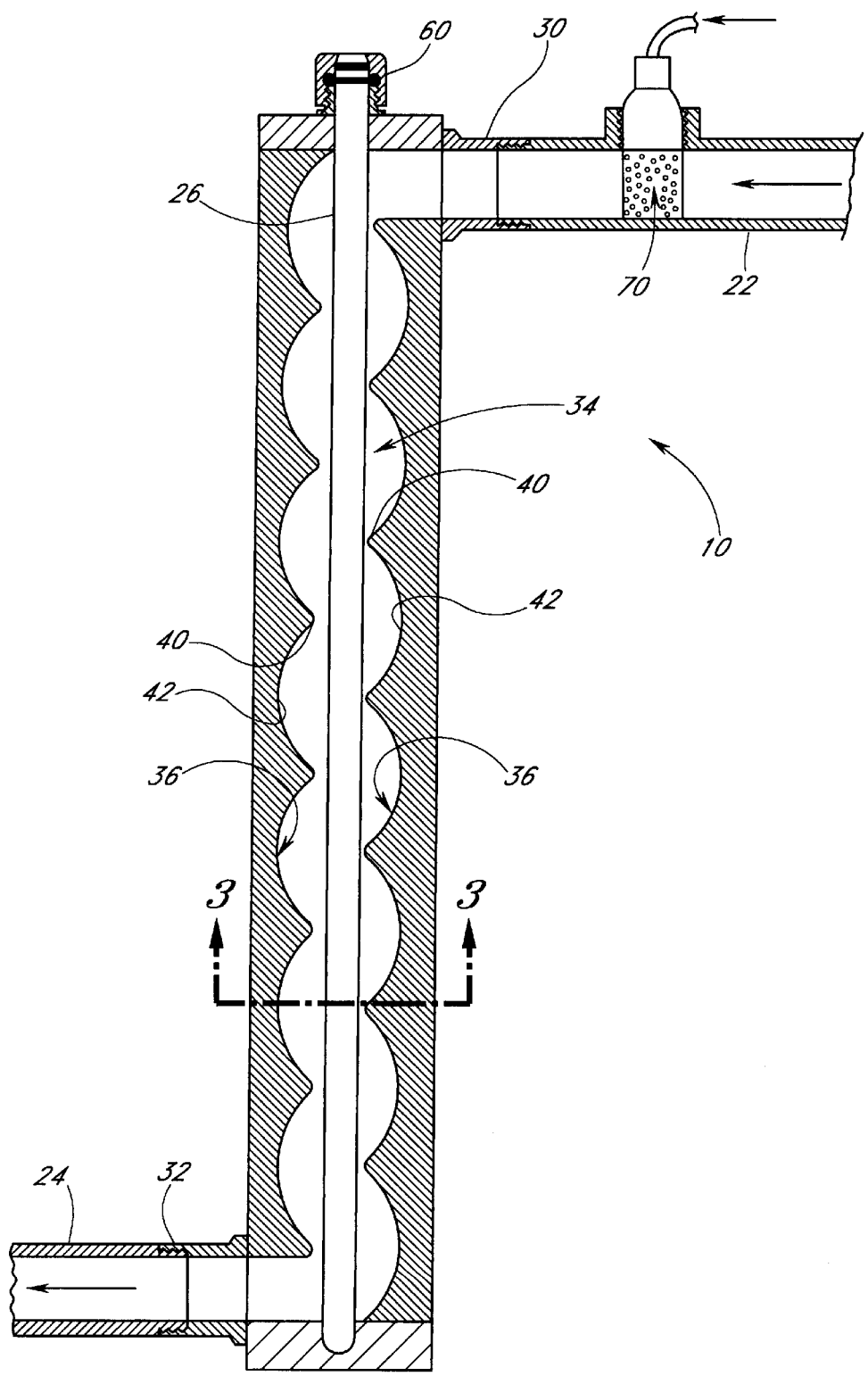
FIG. 2 is a cross-sectional side view of the fluid mixer of FIG. 1, with an oxygen injector fitted at its upstream or inlet end.
Figure 3:
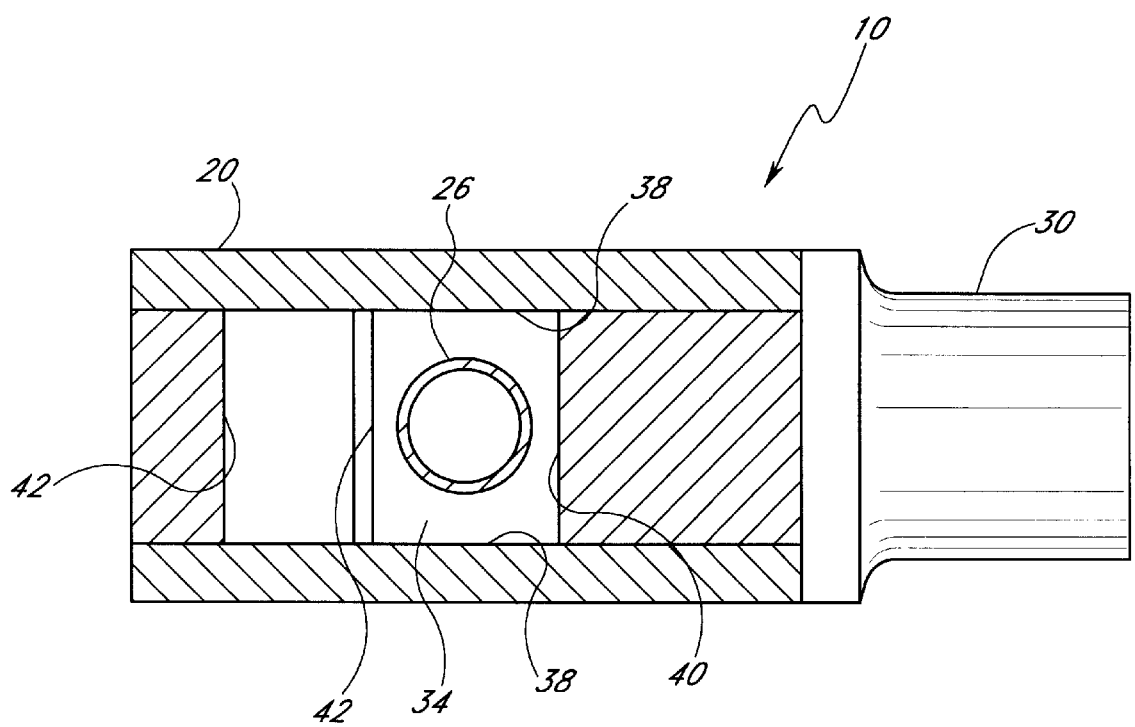
FIG. 3 is a cross-sectional view of the fluid mixer taken on line 3—3 of FIG. 2.

In the embodiment of FIG. 2 a sparger 70 is located in the inlet pipe 22. The sparger 70 includes a screen for producing very small bubbles. The sparger 70 is connected to a supply of oxygen gas- such as bottles of oxygen stored under high pressure. Hence, the sparger 70 serves to produce a very large number of very small bubbles of oxygen into the stream of liquid (water) which is introduced into the inlet pipe 22.

In use, the inlet pipe 22 is coupled to the outlet of a swimming pool pump and the outlet pipe 24 is connected to a water return pipe of a swimming pool. The sparger 70 is connected to a bottle of oxygen gas. Water entering the inlet pipe 22 flows past the sparger 70 which discharges a multiplicity of tiny bubbles of oxygen into the water. The combination of the water and the oxygen follows along the fluid paths 50, 52, 54. In so doing the oxygen is mixed with the water and the mixture is irradiated with the UV radiation. Where the UV radiation impacts upon a molecule of oxygen, it converts it into two oxygen atoms. The oxygen atoms are highly reactive and either attach to another oxygen molecule to produce ozone or oxidise other material which may exist in the water. The ozone is also highly reactive and oxidises other material which may exist in the water. Hence, the UV radiation has the effect of increasing the oxygenation of the water by adding to the oxidation effect.

The highly oxygenated water exits out of the outlet 32 and returns into the swimming pool and mixes with the water in the pool which increases the oxygen level generally in the swimming pool. When the level of oxygen reaches saturation all of the anaerobic bacteria in the swimming pool die. Also, other material in the swimming pool are oxidised.

We also believe that detritus material in the pool will tend to float to the surface of the pool which allows more of the detritus material to be removed by skimmer boxes and the like.

Figure 4:
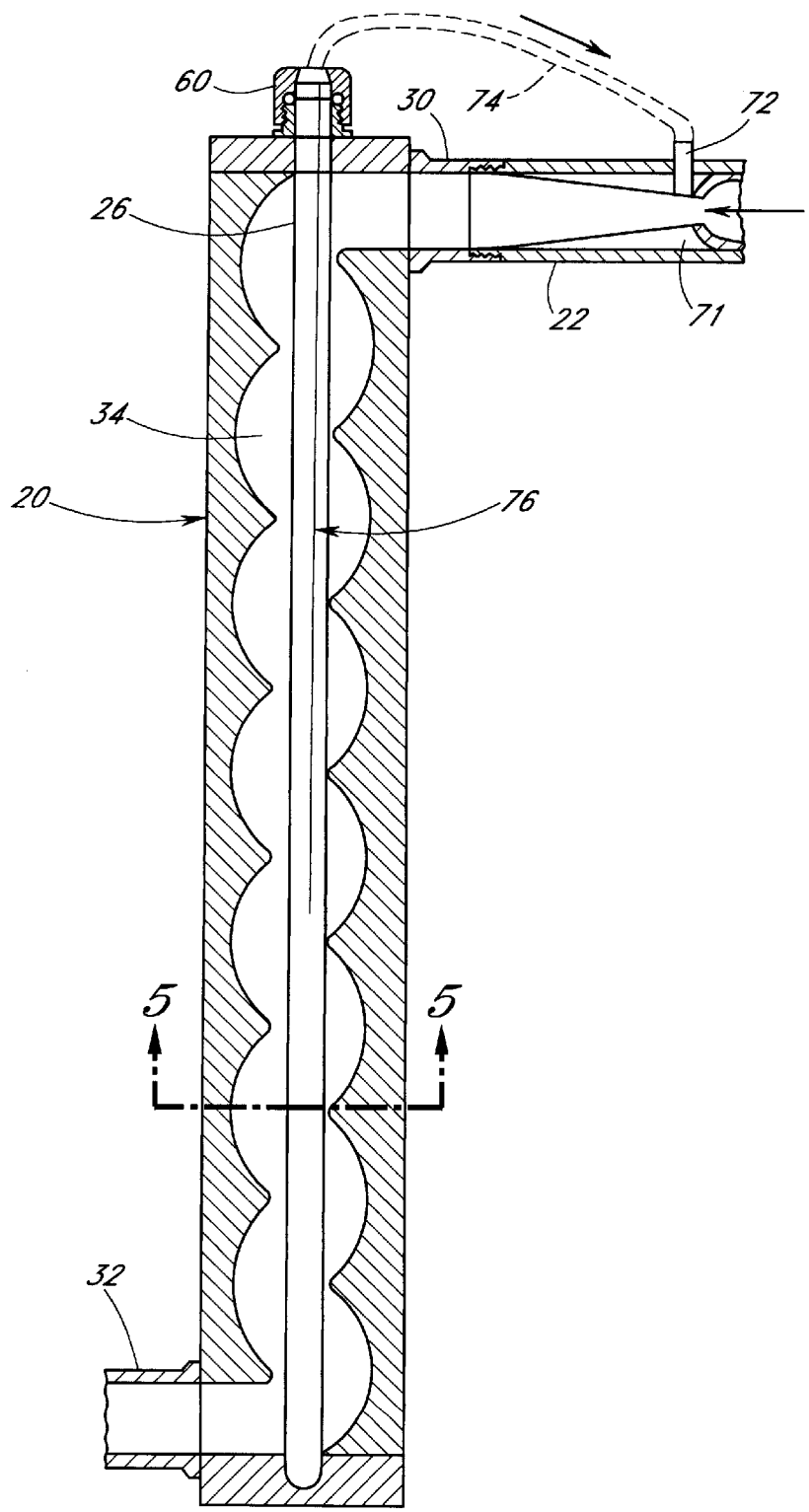
FIG. 4 is a cross-sectional side view of the fluid mixer of FIG. 1, with a venturi injector fitted at its upstream or inlet end.
Figure 5:
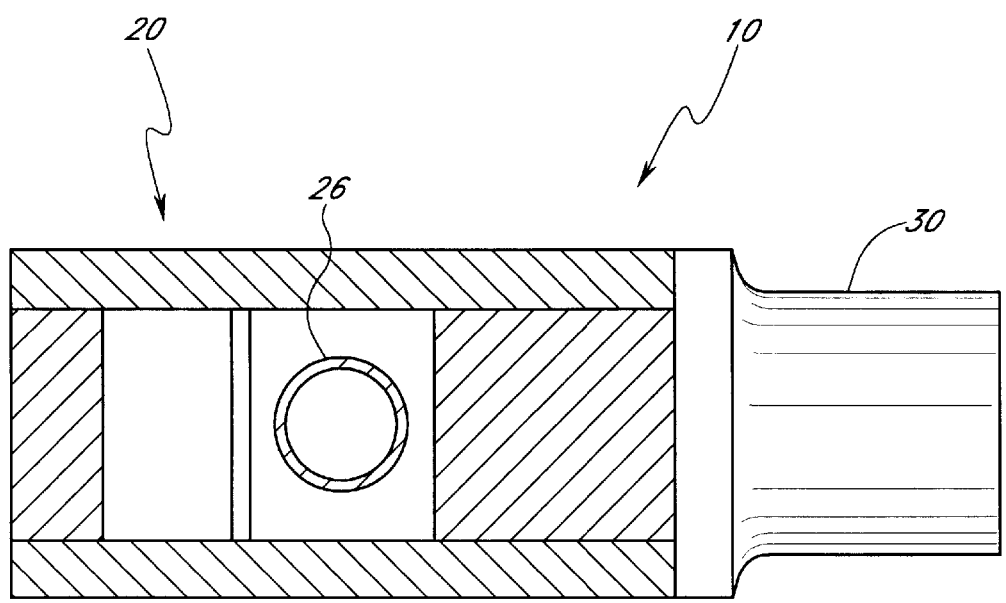
FIG. 5 is a cross-sectional view of the fluid mixer of FIG. 4 taken on line 5—5.

The embodiment of FIGS. 4 and 5 differs from that of FIG. 2 in that in place of the sparger 70, the inlet pipe 22 incorporates a venturi 71 having an air inlet 72 leading into its throat so that the water flowing through the venturi 71 will cause air to be drawn in via the inlet 72 for admixture with the water. We have determined that air drawn into the inlet 72 directly from atmosphere will introduce sufficient oxygen for effective treatment without the need to incorporate a dedicated oxygen supply, such as oxygen bottles and, therefore, this method is preferred in a practical sense. A control valve can be incorporated upstream of the inlet 72 to regulate the amount of air drawn in. Instead of drawing the air directly from atmosphere into the inlet 72, the inlet 72 can be coupled by a pipe 74 to a thin quartz tube 76 within the interior of the outer tube of the UV source. The quartz tube 76 allows air to be drawn through the UV source 26 via the cap 60. The air in the quartz tube 76 is irradiated with UV light which causes some of the oxygen in the air to be converted into elemental oxygen and ozone.

The mixer of the preferred embodiment has the advantage that intimate mixing of the fluids is created by using a chamber which develops the fluid paths 50, 52, 54. This mixing has the added advantage that it takes place in close proximity to the UV source 26 which increases the efficacy of the UV radiation and hence leads to better treatment of the fluid. The particular form of the fluid paths within the chamber is determined by the described shaping of the opposed side walls 36 and this shaping not only provides intimate mixing but achieves this effect without creating a significant pressure drop across the chamber which would otherwise impair the efficiency of air injection using a venturi as is preferred.

Where the fluid mixer 10 is used to treat water from a swimming pool it obviates the need to use chlorine. Also, we believe that since the water is super-oxygenated it will require much less time in treating the water than conventional filter systems which are based on chlorine. Further, since it is only oxygen it is safe to use the treatment whilst people are using the swimming pool which is in contradistinction to the application of ozone into swimming pools (where it is preferred that measures be taken to ensure that no ozone enters the pool whilst people are using it, or alternatively, the treatment of the water in the pool only happens when there are no people in the pool).

Modifications and variations are within the scope of the present invention. For example, two or more of the fluid mixers could be arranged in parallel in order to allow a greater rate of flow. In such a case, manifolds would be used to connect the fluid mixers to a common inlet pipe. Also, two or more of the fluid mixers 10 could be arranged in series in order to increase the duration of the UV treatment and the like. Further, the fluid mixer could be adapted for other forms of conditioning treatment where mixing is important. For example, the treatment could involve cooling by using a refrigerant source in place of the UV source or heating by using a heating source. As a further alternative a silver rod could be used and the interior of the chamber 34 could be coated with copper so as to ionise the fluid; other ionising materials could also be used.

The fluid mixer particularly described also has other significant applications involving the oxygenation of water by intimate mixing, without involving the use of additional conditioning treatment such as UV irradiation. For example the mixer can be used in a system for removing iron from solution, wherein the intimate mixing of the water with air facilitates subsequent precipitation of the iron in a holding tank. The mixing action within the mixer also has been found to accurately control and stabilise the pH to approximately 7.2 due to a "stripping" action which takes place wherein the air travels through the water at a greater velocity than the water velocity. The mixer can also be used as part of the feed system within hydroponic agriculture.

Other modifications and variations are possible within the scope of the invention.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

What is claimed is:

1. A fluid mixer including an elongate mixing chamber having an inlet at one end for admission of fluid and an outlet at an opposite end, the chamber having two opposed longitudinal side walls each of which consists of a series of troughs and peaks at each side of the longitudinal axis of the chamber and extending along the length of the chamber, the series of troughs and peaks at opposite sides of the longitudinal axis being relatively displaced so that the peaks of the profile along one side face the troughs of the profile along the other side, the troughs being of generally part-cylindrical shape and the peaks being cusps of generally rectilinear form, fluid conditioning means mounted within the chamber and extending longitudinally within the chamber for conditioning the fluid as it passes through the chamber, the cusps lying close to the conditioning means so as to cause the fluid to pass close to the conditioning means at periodic intervals during passage through the chamber, and the configuration of the troughs and cusps causing fluid entering the chamber through the inlet to flow along a tortuous path through the chamber towards the outlet to create a turbulent flow which promotes intimate mixing within the fluid.

2. A fluid mixer according to claim 1 including means for feeding a liquid and a gas into the inlet to be mixed intimately by passage through the mixing chamber.

3. A fluid mixer according to claim 2, wherein the liquid is water and the gas is an oxygen-containing gas.

4. A fluid mixer according to claim 2, wherein the feed means comprises a passage including a venturi through which the liquid flows, with a gas inlet leading into a throat of the venturi.

5. A fluid mixer according to claim 1, wherein the conditioning means is a sterilizer, a cooler, or a heater.

6. A fluid mixed according to claim 5, wherein the conditioning means is a sterilizer comprising a source of UV radiation mounted within a tube.

7. A fluid mixer according to claim 6, wherein the tube includes an air inlet and an air outlet for air irradiated by the ultraviolet radiation, said air outlet being coupled to the feed means.

* * * * *